United States Patent [19]

Eavenson, Sr. et al.

[11] Patent Number: 5,509,710

[45] Date of Patent: Apr. 23, 1996

[54] RESCUE VEHICLE

[75] Inventors: Jimmy N. Eavenson, Sr., Juneau; Stanley J. DeBraal, West Bend; Werner E. Biedermann, Horicon; Lloyd E. Wright, Beaver Dam; Daryl A. Levenhagen, Horicon, all of Wis.

[73] Assignee: Deere & Company, Moline, Ill.

[21] Appl. No.: 401,323

[22] Filed: Mar. 9, 1995

Related U.S. Application Data

[63] Continuation of Ser. No. 167,471, Dec. 15, 1993, abandoned.

[51] Int. Cl.$^6$ ........................................ A61G 3/00
[52] U.S. Cl. ........................ 296/19; 276/64; 276/65.1; 5/626; 248/499
[58] Field of Search ................... 296/16–20, 65.1, 296/64; 5/625, 626; 248/499, 510; 410/85, 94, 101, 106, 108, 110

[56] References Cited

U.S. PATENT DOCUMENTS 1,287,855  12/1918  Brand ........................................ 296/19

(List continued on next page.)

FOREIGN PATENT DOCUMENTS 789577  10/1935  France ..................................... 296/20

(List continued on next page.)

OTHER PUBLICATIONS

Sales brochure entitled "Taylor–Dunn Industrial Trucks", published by a company known as Taylor–Dunn in 1990, front cover, inside cover, pp. 1–21, and back cover.
Sales brochure entitled "E–Z–Go Industrial", published by E–Z–Go Division of Textron Inc. in 1988, front cover, twelve pages and back cover.
One page having copies of four photos of a prop rod for a Deere Model 9500 Combine, photos taken by a Deere & Co. employee, illustrating prop rod that was available prior to the invention of the subject application.
Deere & Company, 1993 John Deere Combine Selection Guide for Maximizer 9400, 9500, 9600, Sidehill, CTS Rice Combines, 24 pages, published in the U.S.A. in 1993. See page 19 for door held open by prop rod shown in above photos.
Golf Course Management–Magazine Oct 1993, Customizing the Utility Vehicle, pp. 24 and 26, published in the U.S.A. in Oct. 1993.
E–Z–Go, Division of Textron, E–Z–Go Industrial, 14 pages (see particularly p. 13), published in the U.S.A. in 1988.
Taylor–Dunn, Taylor–Dunn Industrial Trucks Tough and Dependable, see particularly p. 19 of the 24 page brochure, published in the U.S.A. in 1990.
Deere & Company, Parts Catalog for John Deere Model 1800 Utility Vehicle, Seat and Seat Base, pp. 90–94 and 90–95, published in the U.S.A. on 4 May 1993.
Deere & Company, Parts Catalog for John Deere Model F510 and F525 Front Mowers, pp. 60–64, 6, and 6A, published in the U.S.A. on 20 Aug. 1993.
Motor Vehicle Monthly, "Unique Construction of Convertible Invalid Car"

*Primary Examiner*—Dennis H. Pedder

[57]   ABSTRACT

An emergency rescue vehicle is provided for transporting one to three injured persons carried on backboards. A first backboard is positionable longitudinally on the floor of a utility box. Fastener members or anchors protrude upwardly from the floor for generally blocking the first backboard from shifting laterally, and provide structure to which the backboard and victim can be strapped or otherwise secured for travel over rough or inclined terrain. Side walls of the utility box support second and third laterally extending backboards above the first backboard. Fastener members positioned on the top edges of the side walls generally block the second and third backboards from shifting longitudinally, and serve as anchors to which the backboards and victims can be strapped or otherwise secured. The vehicle includes a forwardly facing attendant seat over which one of the backboards extends.

1 Claim, 4 Drawing Sheets

U.S. PATENT DOCUMENTS

| | | | |
|---|---|---|---|
| 2,278,450 | 4/1942 | Jones | 296/24.1 |
| 2,387,186 | 10/1945 | Schofield | 296/19 |
| 2,520,128 | 8/1950 | Cushman | 296/19 |
| 3,083,670 | 4/1963 | Harlander et al. | 410/85 |
| 3,241,726 | 1/1969 | Getter | 410/110 |
| 3,328,069 | 6/1967 | Dumas | 296/65.1 |
| 3,731,972 | 5/1973 | McConnell | 297/216 |
| 3,840,221 | 10/1974 | Hogan | 5/625 X |
| 4,025,108 | 5/1977 | Leighty et al. | 297/335 |
| 4,273,374 | 6/1981 | Portman | 296/19 |
| 4,295,765 | 10/1981 | Burke | 410/101 |
| 4,319,653 | 3/1982 | Carlson | 180/89.17 |
| 4,415,197 | 11/1983 | Meyer | 296/216 |
| 4,425,978 | 1/1984 | Star | 180/243 |
| 4,565,407 | 1/1986 | Brautigam | 297/335 |
| 4,696,508 | 9/1987 | Brautigam | 296/65.1 |
| 4,930,593 | 6/1990 | Swartzendruber et al. | 180/89.17 |
| 4,946,193 | 8/1990 | Oka | 280/769 |
| 5,012,880 | 5/1991 | Abner | 180/89.11 |
| 5,037,155 | 8/1991 | Holm et al. | 296/65.1 |
| 5,048,154 | 9/1991 | Swartzendruber | 16/267 |
| 5,136,752 | 8/1992 | Bening et al. | 16/287 |
| 5,141,277 | 8/1992 | Alexander | 296/43 |
| 5,230,544 | 7/1993 | Morritt et al. | 296/65.1 |
| 5,302,064 | 4/1994 | Davis | 410/101 X |

FOREIGN PATENT DOCUMENTS

| | | | |
|---|---|---|---|
| 1013215 | 7/1952 | France | 296/19 |
| 953578 | 12/1956 | Germany | 410/101 |
| 1083498 | 6/1960 | Germany | 296/20 |
| 1715 | of 1900 | United Kingdom | 296/19 |
| 549884 | 12/1942 | United Kingdom | 296/20 |

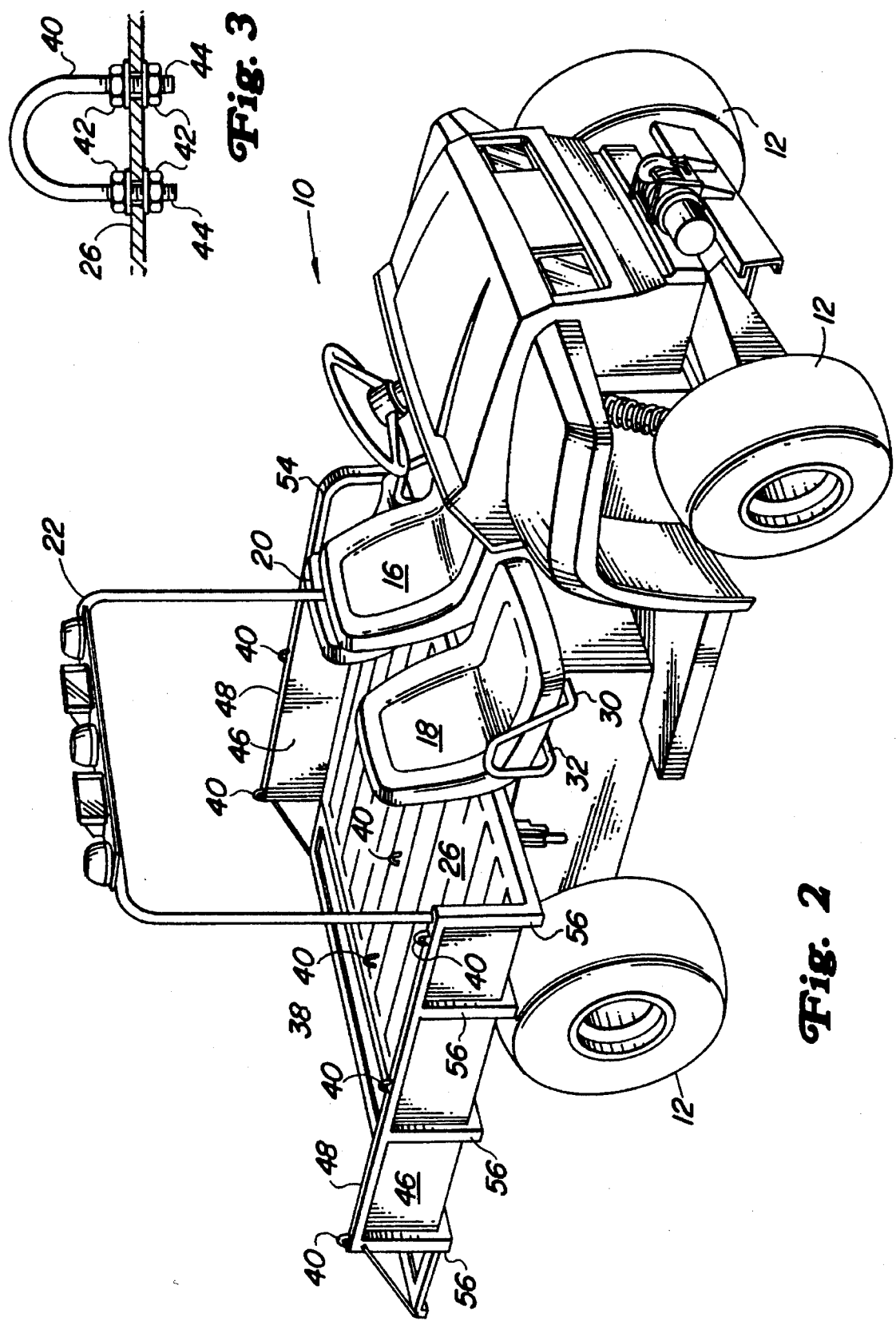

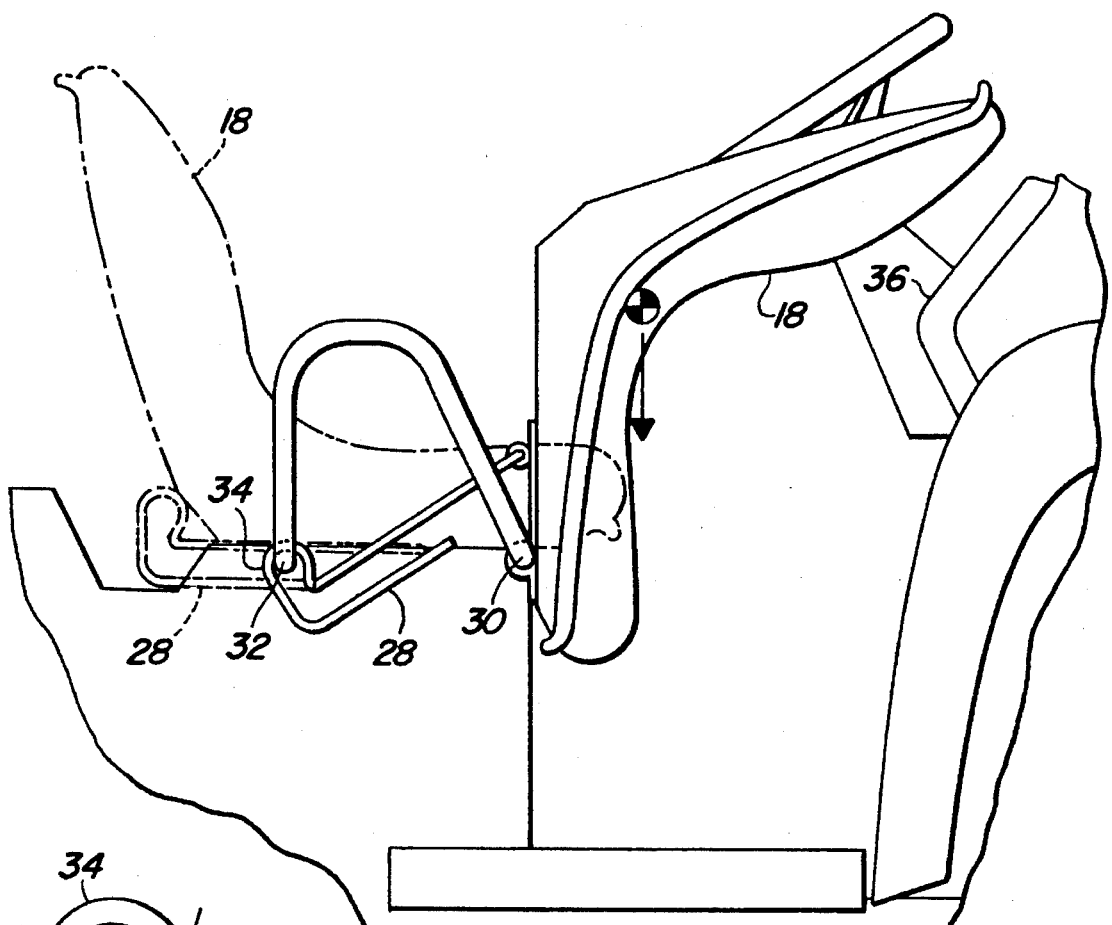
Fig. 6
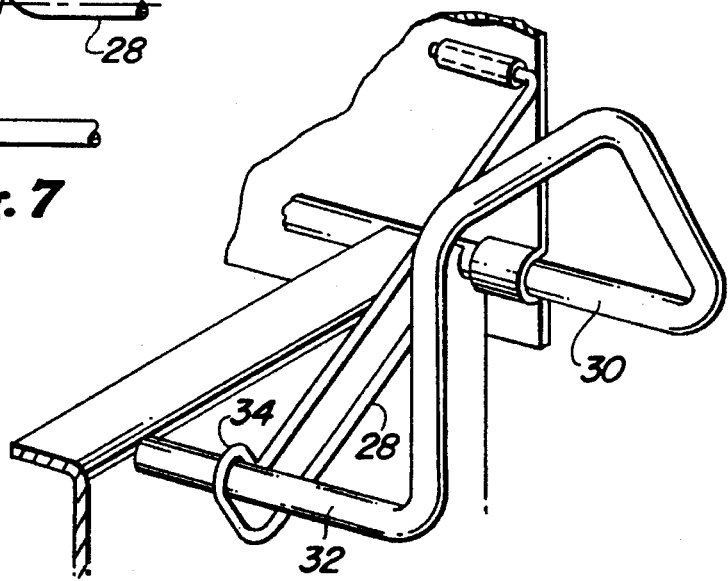
Fig. 7
Fig. 8

RESCUE VEHICLE

This application is a Continuation of application Ser. No. 08/167,471, filed 15 Dec. 1993, now abandoned.

BACKGROUND OF THE INVENTION

This invention relates to emergency rescue vehicles.

Conventional emergency vehicles have been designed for the transport of injured persons on stretchers or backboards. These open vehicles facilitate removal of injured persons from areas such as stadiums, parks, beaches, forests, and other areas that larger conventional automotive ambulances have difficulty traveling through. The small powered vehicles or carts typically include a forwardly located operator station where a driver is seated during operation of the vehicle. The vehicles typically include a generally flat portion located to the rear of the driver's seat for receiving a stretcher or backboard on which an injured person is situated. A nurse's seat or attendant seat has been included on the vehicle for allowing a medically trained individual to ride on the vehicle within reach of the injured person. Medical aid can thereby be administered by the attendant during vehicle travel if need be.

Many such emergency vehicles are adapted to accommodate only a single stretcher or injured person, and are generally incapable of carrying two or more backboards for transporting injured persons. The vehicles that do accomodate two or more backboards are relatively large, thereby generally detracting from the maneuverability of the vehicle and adding to the cost of the vehicle. Many emergency vehicles are not adapted for transporting injured persons over rough, off-road terrain, because the vehicle itself is not constructed to withstand travel over rugged terrain or because the emergency vehicles do not function to secure the stretchers sufficiently to allow travel over rough or inclined terrain without the stretcher and injured person shifting or falling off the vehicle.

Therefore it would be desirable to provide an emergency rescue vehicle which is capable of transporting injured persons on backboards over rough terrain. It would be desirable to provide a vehicle which is adapted to carry one or more such injured persons simultaneously while remaining relatively maneuverable. It would be desirable to provide an attendant seat that allows a seated attendant to administer aid to a plurality of injured persons being transported by the vehicle. It would also be desirable to provide a vehicle which allows the injured persons and stretchers or backboards to be secured to the vehicle and thereby facilitate travel over rough or inclined terrain.

SUMMARY OF THE INVENTION

The preferred embodiment of the present invention provides an emergency rescue vehicle for transporting one to three persons carried on backboards. A first backboard can be positioned longitudinally with respect to the vehicle on the floor of a cargo or utility box. Fastener members or anchors protrude upwardly from the floor for generally preventing the first backboard from shifting laterally. The backboard can be latched or otherwise tied to the fastener members for securing the backboard and victim on the vehicle for travel over rough or inclined terrain. The utility box includes side walls which are reinforced to support second and third backboards extending laterally. The side walls extend upwardly a sufficient distance above the floor of the utility box to support the second and third backboards above the legs and mid-section of a person lying on the first backboard. Fastener members are positioned on the top edge of the side walls and serve as anchors to which the backboards can be latched or secured. The side walls' fastener members also serve to generally block the second and third backboards from shifting longitudinally when traveling over rough or inclined terrain. The vehicle includes a forward facing attendant seat in which a person can sit and reach the injured persons when only one or two backboards are being transported. The vertical height of the attendant seat is small enough that the side walls can support the third backboard generally directly above the attendant seat.

BRIEF DESCRIPTION OF THE DRAWINGS

FIG. 2 is a perspective view of the right side of the vehicle according to the preferred embodiment.

FIG. 3 shows the fastener member coupled with the floor of the utility box according to the preferred embodiment.

FIG. 6 is a side view of the seat and latch mechanism, with the seat and latch being shown in full lines in its forwardly pivoted position, and being shown in phantom in its rearwardly lowered position.

FIG. 7 shows the bar member in engagement with the offset portion of the latch mechanism when the seat is pivoted to upwardly to its forward position.

FIG. 8 is a perspective view of the latch mechanism when the seat is in its raised position.

DESCRIPTION OF THE PREFERRED EMBODIMENT

Figure 1:
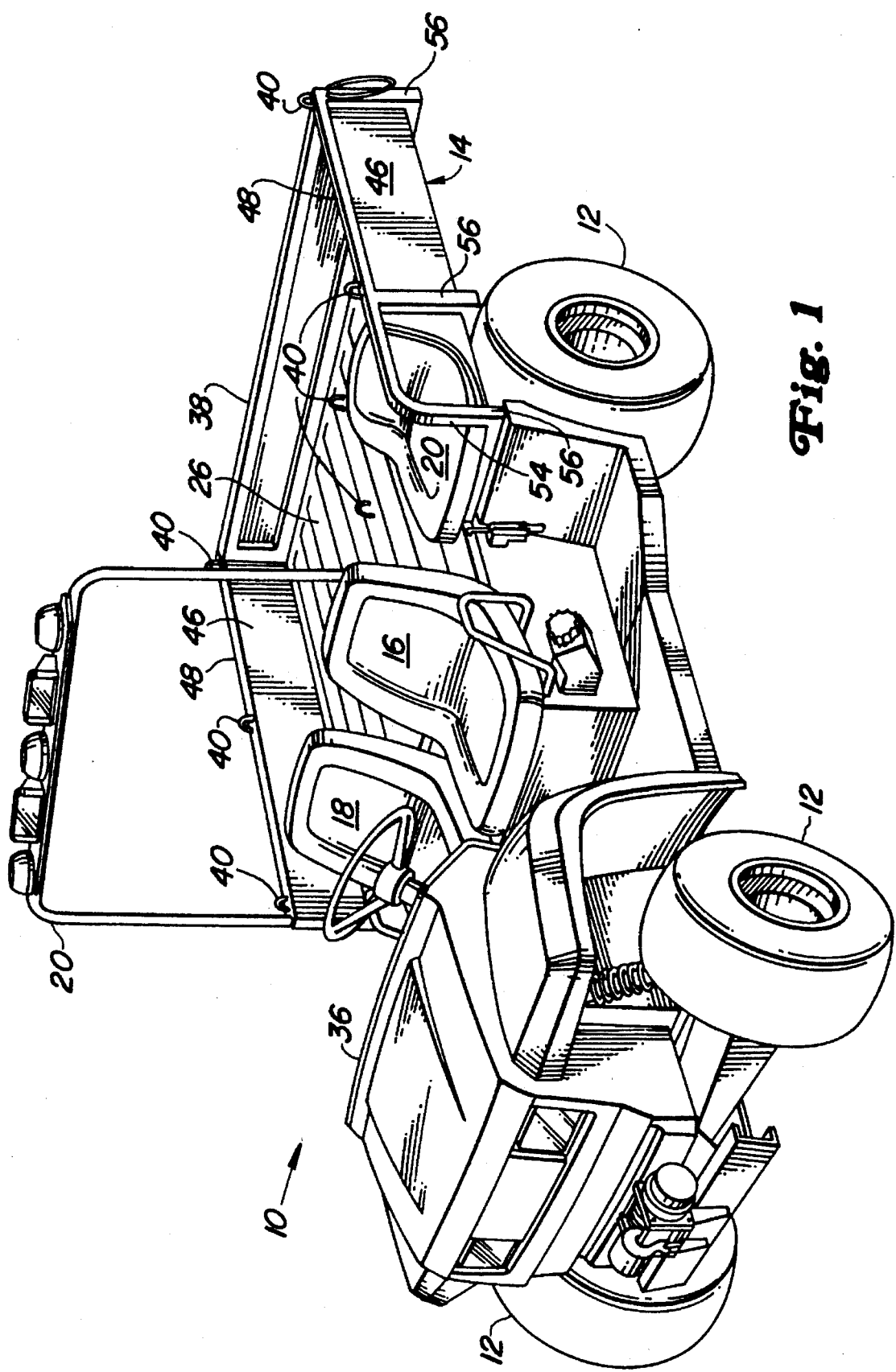
FIG. 1 is a perspective view of the left side of the emergency vehicle according to the preferred embodiment of the present invention.

Referring now to FIGS. 1 and 2, there is shown an emergency vehicle 10 according to the preferred embodiment of the present invention. The vehicle 10 is generally adapted for off-road travel over relatively rough terrain. The vehicle 10 includes four large ground engaging wheels 12 and a utility box 14 carried at the rear of the vehicle 10. A driver's seat 16, passenger seat 18 and attendant seat 20 are provided, and a light bar 22 extends upwardly and across the vehicle 10 directly behind the driver's and passenger's seats 16 and 18.

As seen in FIGS. 4–8, the passenger seat 18 is adapted to tilt forwardly to allow clearance for a first backboard 24 to be carried longitudinally on the floor 26 of the right side of the utility box 14. A rod-like latch mechanism 28, as best seen in FIG. 6–8, is coupled with the underside of the passenger seat 18. When the passenger seat 18 is in its rearward lowered position, the latch 28 is in the position shown in phantom in FIG. 6. When an operator pivots the passenger seat 18 forwardly about bar 30 to the position shown in solid lines in FIG. 6, the latch 28 shifts forwardly with the passenger seat 18 and assumes the position shown in solid lines in FIGS. 6–8. A bar member 32 fixed with the vehicle frame becomes received within an offset portion 34 formed in the end portion of the latch 28, and is held securely therein. The latch member 28 secures the passenger seat 18 in its forwardly tilted position and prevents the passenger seat 18 from returning to its lower rearward position. The latch 28 also prevents the passenger seat 18 from pivoting forwardly against the dash 36 of the vehicle 10, and thereby allows a driver clearance to reach controls or devices such as a radio which may be positioned in the right portion of the dash 36. To return the passenger seat 18 to its lowered position the operator lifts the latch 28 slightly to remove the bar member 32 from the offset portion 34 of the latch 28, and the passenger seat 18 can then be pivoted rearwardly and downwardly.

Figure 4:
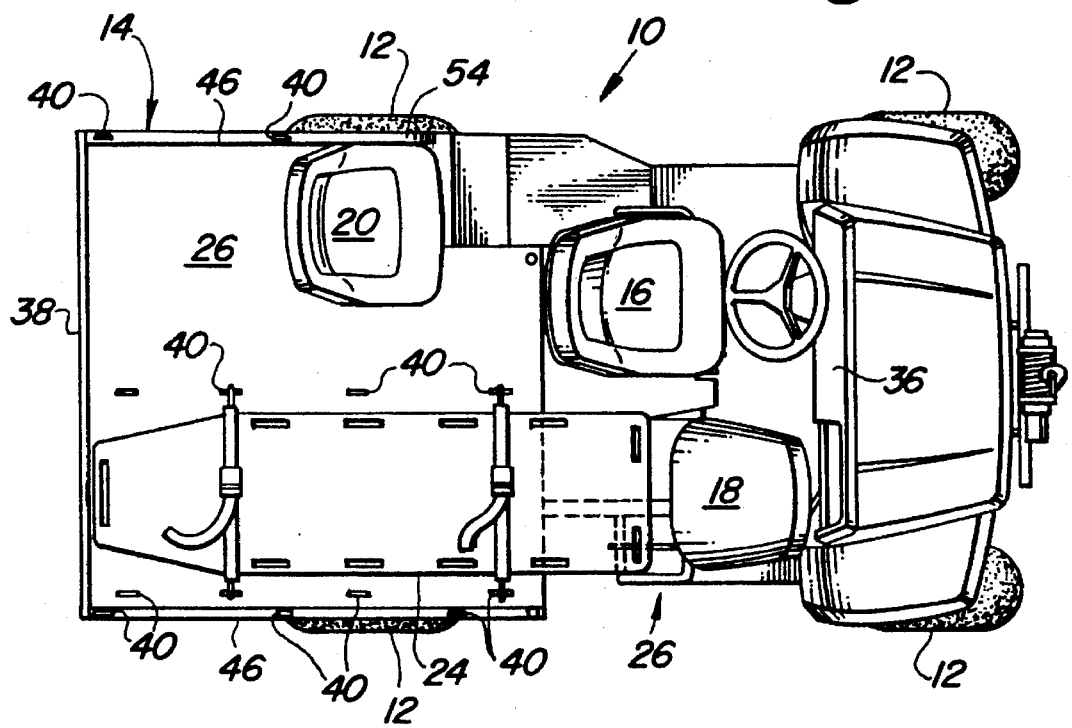
FIG. 4 is a plan view of the emergency vehicle showing the passenger seat pivoted forwardly and a first backboard positioned longitudinally on the floor of the utility box.

The utility box 14 is adapted to receive backboards on which injured persons are transported. When a single injured person is to be evacuated by the vehicle 10, a backboard 24 and the injured person can be positioned longitudinally on the right side of the floor 26 of the utility box 14 as seen in FIG. 4. The tailgate 38 of the utility box 14 can be opened to make more room for and further support particularly large persons or backboards. As discussed above, the passenger seat 18 pivots forwardly to allow clearance for the backboard 24. Fastener means 40 extend upwardly from the floor 26 of the utility box 14 and are arranged generally in rows along the sides edges of the backboard 24. The fastener means 40 serve to locate the backboard 24 and generally confine the backboard 24 to a particular location on the floor 26 of the utility box 14. Two rows of fastener means 40 are coupled with the floor 26 of the utility box 14 and abut the side edges of the backboard 24 for generally preventing or blocking the backboard 24 from shifting laterally across the floor 26. The fastener means 40 are inverted U-shaped rod members or U-bolts which define upwardly extending loop members to which the backboard 24 may be strapped or otherwise coupled to further secure or fasten the backboard 24 against shifting during travel. Straps or belts which extend over and across the patient laying on the backboard 24 can also be secured or fastened to the U-shaped fastener members 40 for stabilizing the patient against motion. As seen in FIG. 3, the fastener members 40 are coupled to the floor 26 of the utility box 14 by a plurality of nuts 42 which engage threaded end portions 44 of the U-bolts 40.

Figure 5:
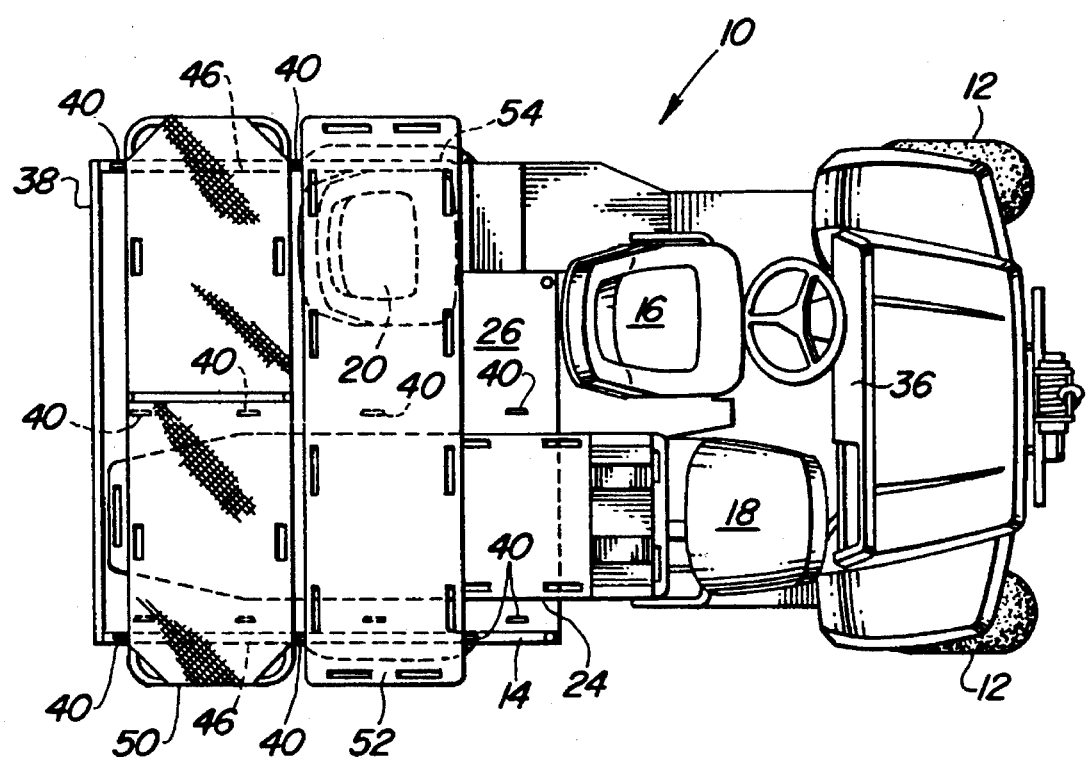
FIG. 5 is a plan view of the vehicle with a first backboard being carried on the floor of the utility box, and second and third backboards being carried by the side walls of the utility box.

As can be seen in FIGS. 5, the emergency vehicle 10 according to the preferred embodiment is also adapted to simultaneously transport two or three injured persons laying on backboards. The utility box 14 includes upwardly extending side walls 46 having top edges 48 upon which second and third backboards 50 and 52 can be positioned. Fastener means 40 extend upwardly from the top edges 48 of the side walls 46 for locating the second and third backboards 50 and 52 and generally prevent the backboards 50 and 52 from shifting fore and aft on the side walls 46. The second and third backboards 50 and 52 can be latched, fastened or otherwise anchored to the fastener members 40 on the side walls 46 or floor 26 of the utility box 14 for further securing the backboards 50 and 52 against undesirable motion or shifting. Similarly, a belt or strap extending across the person laying on the backboards 50 and 52 can also be attached to the side walls' fasteners 40, or to the fastener members 40 on the floor 26 of the utility box 14.

When two patients on backboards are to be transported by the vehicle, the first backboard 24 is positioned longitudinally on the floor 26 of the utility box 14, and the second backboard 50 is positioned on the rear portion of the utility box side walls 46, as shown in FIG. 5. In this configuration, the side walls 46 serve to space the second backboard 50 a sufficient distance above the first backboard 24 to allow clearance for the legs of the person laying on the first backboard 24. The second backboard 50 is positioned to the rear of the attendant seat 20, and therefore a nurse or medical attendant can sit in the attendant seat 20 in close proximity to both injured persons when two backboards are being transported.

When three injured persons on backboards are being transported, the third backboard 52 is positioned on the top edges 48 of the side walls 46 of the utility box 14 generally directly above the attendant seat 20. The presence of the third backboard 52 prevents an attendant from occupying the attendant seat 20 during transport. The attendant seat 20 has a relatively low back-rest portion which does not extend above the top edge 48 of the side walls 46 of the utility box 14. The small vertical dimension or height of the attendant seat 20 allows clearance for the third backboard 52 to properly engage the side walls 46 of the utility box 14. The fastener members 40 protruding upwardly from the top edge 48 of the side walls 46 can be utilized for securing the third backboard 52 and the patient laying thereon against movement. The preferred embodiment provides five fastener members 40 on the top edges 48 of the side walls 46. An arm rest or hand-hold 54 on the left side of the attendant seat 20 is available for anchoring, tying down or otherwise securing the front left corner of the backboard 52 to the vehicle 10. The third backboard 52 is positioned directly above the attendant seat 20 such that the weight of the third backboard 52 and injured person is applied to the vehicle 10 at generally the same location longitudinally as would be the weight of a seated attendant. Therefore, the weight distribution and stability of the vehicle 10 will be generally the same whether two persons are carried on backboards 24 and 50 while an attendant occupies the attendant seat 20 or three persons are carried on backboards 24, 50 and 52.

The side walls 46 of the utility box 14 must be of sufficient strength to support the weight of two injured persons laying on backboards 50 and 52. To achieve sufficient strength to properly support such a large load, the utility box 14 and side walls 46 of the preferred embodiment include a framework of structural tubing 56 which reinforces the side walls 46 and floor 26 of the utility box 14. The structural tubing 56 extends upwardly along the side walls 46 for strengthening said side walls 46.

The preferred embodiment of the present invention is adapted to accomodate various types of backboards. As seen in FIGS. 4 and 5, a variety of shapes and sizes of backboards can be positioned on the utility box in the various configurations. The second backboard 50 shown in FIG. 5 folds at its midsection. Many kinds of baskets or rescue sleds (such as those used for transporting ski accident vicitms down mountains) can be transported by the vehicle according to the present invention.

What is claimed:

1. A vehicle adapted for transporting a plurality of injured persons carried on backboards, comprising:

a box structure having a floor portion and side walls extending upwardly from said floor portion, said side walls and floor portion defining a U-shaped structure having a generally open top, a vehicle driver's seat positioned forwardly from said box structure, a passenger seat adjacent the driver's seat, said passenger seat being shiftable forwardly for allowing a first backboard to be positioned longitudinally on the floor portion of the box structure such that a portion of the first backboard is located in the space vacated by the forwardly shifted passenger seat, a plurality of fastener means coupled with the floor portion, and abuttable with the side edges of the first backboard for locating and generally maintaining the first backboard in its proper position on the floor of the box structure, said fastener means also serving as structure to which the first backboard can be secured, wherein said fastener means further comprise an upwardly projecting loop member against which the side edges of the first backboard may abut for locating the first backboard and maintaining the first backboard in its proper position during transport, and a plurality of said fastener means are coupled with upper edges of said side walls and are abuttable with the side edges of second and third backboards for generally confining and positioning said second and third backboards to extend transversely across the open top of said box structure while said longitudinally extending first backboard and injured person are positioned on the floor of the box structure, said second backboard being positioned to the rear of the third backboard, and wherein said fastener means coupled with the floor portion and the side walls are spaced sufficiently to allow a plurality of different sizes and types of backboards to be secured with the vehicle by said fastener means, a forwardly facing attendant seat positioned generally within said box structure and adjacent one of said side walls, said attendant seat being located forwardly of the second backboard and adjacent the first backboard such that an attendant may be seated in the attendant seat when only the first and second backboards are carried by the vehicle, said box structure being adapted to support the third backboard generally directly over the attendant seat.

* * * * *